Sept. 20, 1971  D. E. TRUMBULL  3,606,269
MIXING DEVICE
Filed Feb. 10, 1970  5 Sheets-Sheet 4
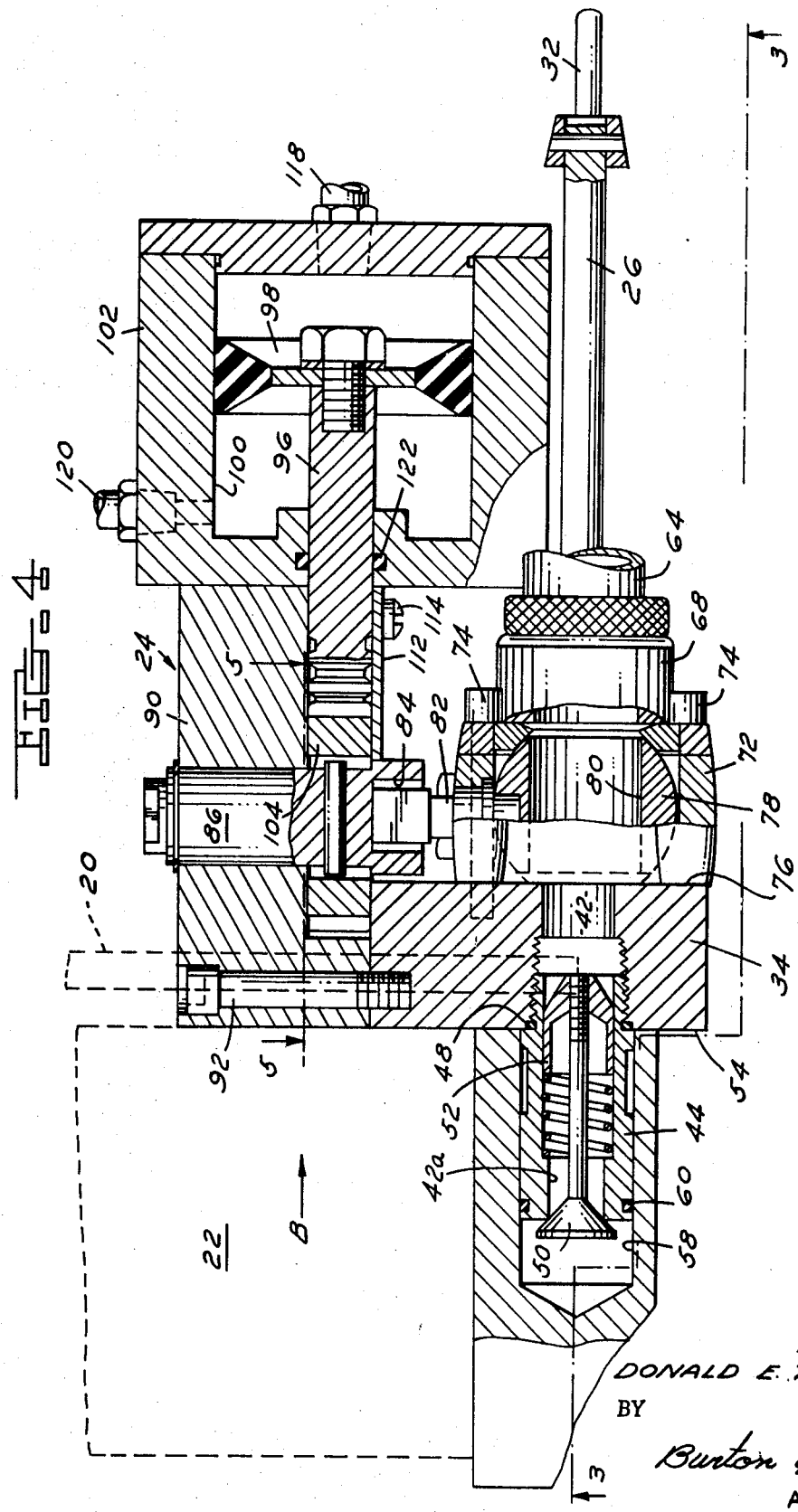
INVENTOR.
DONALD E. TRUMBULL
BY
Burton & Parker
ATTORNEYS

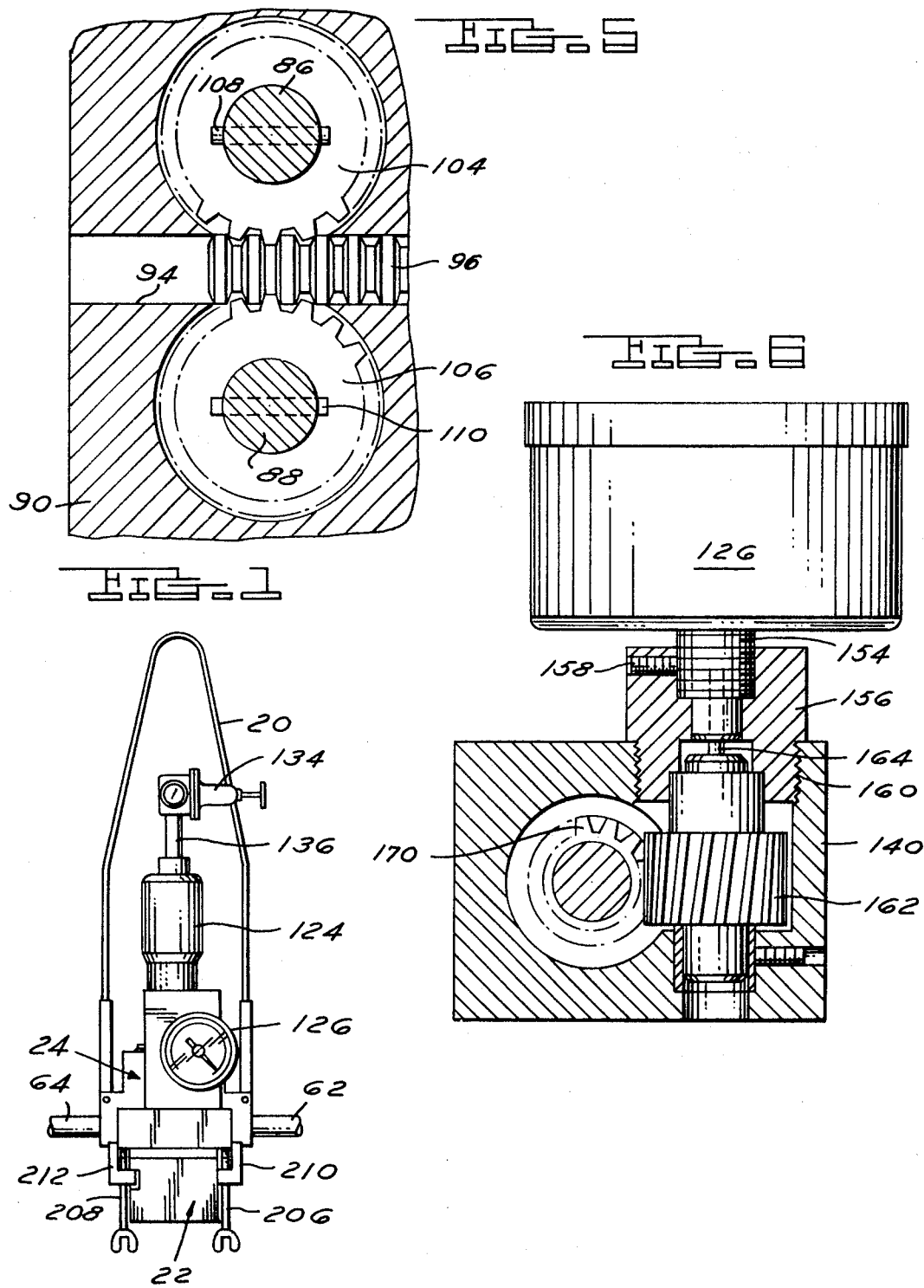

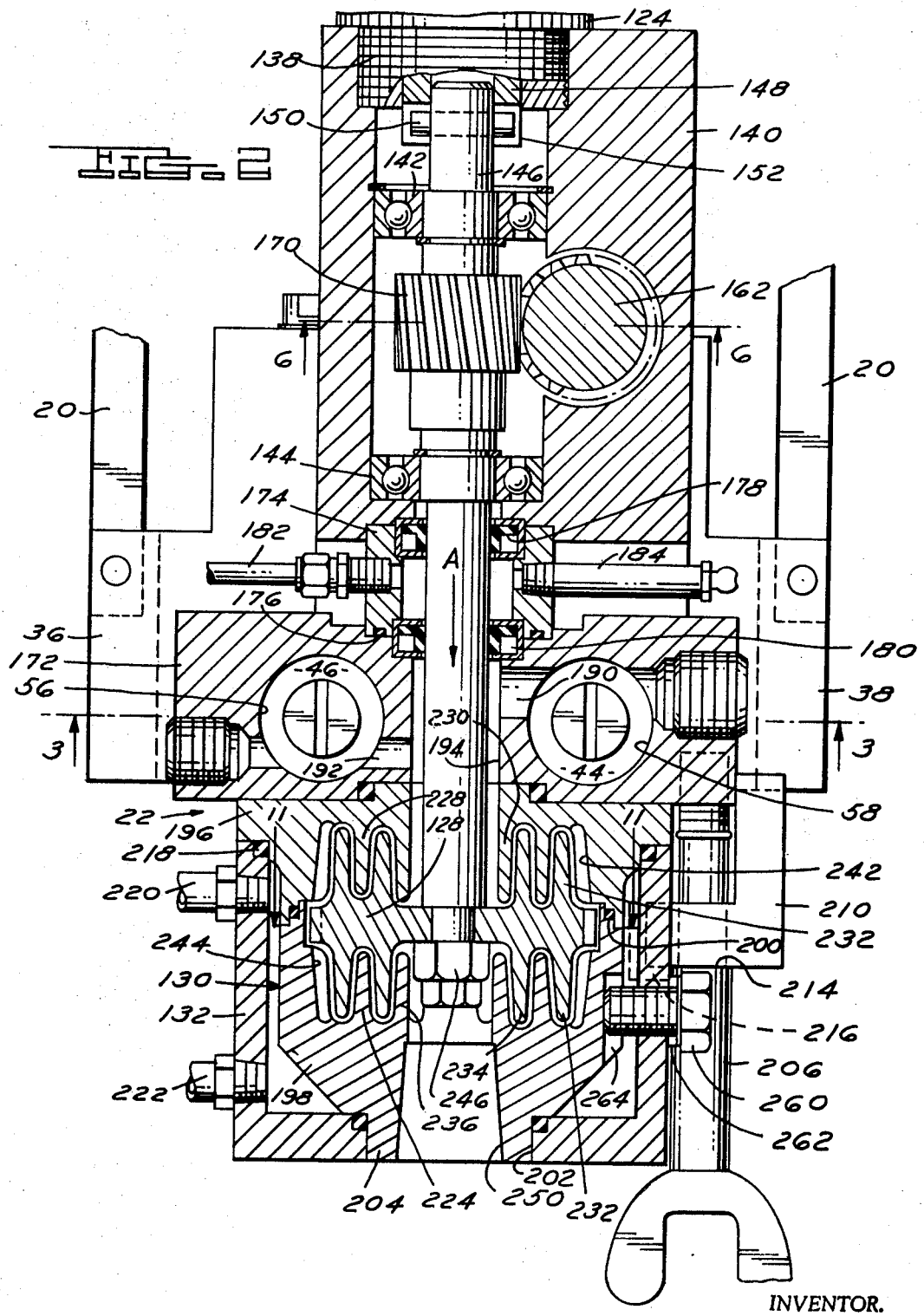

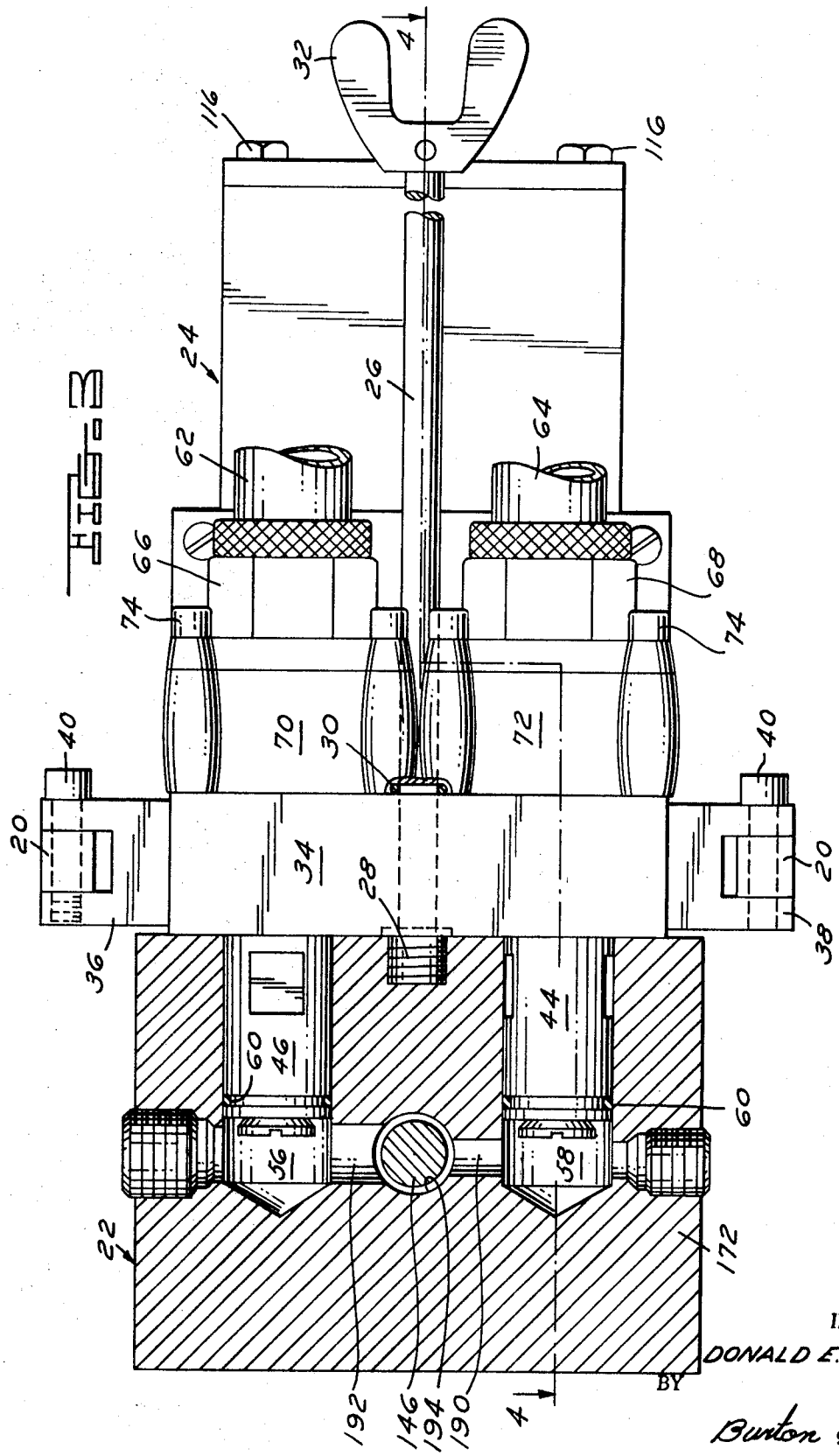

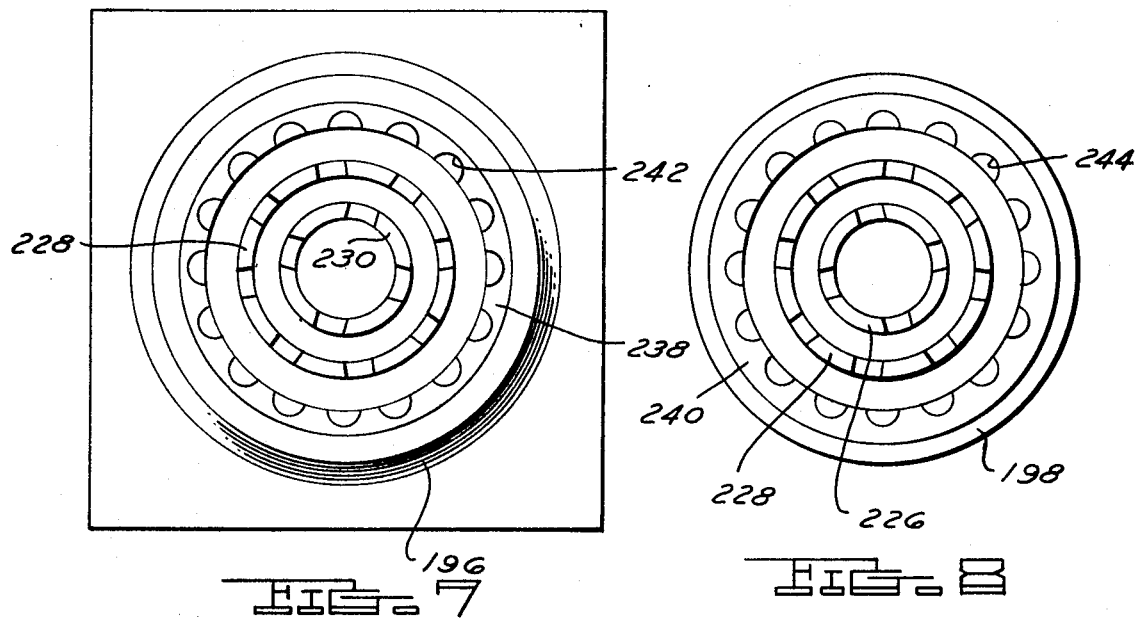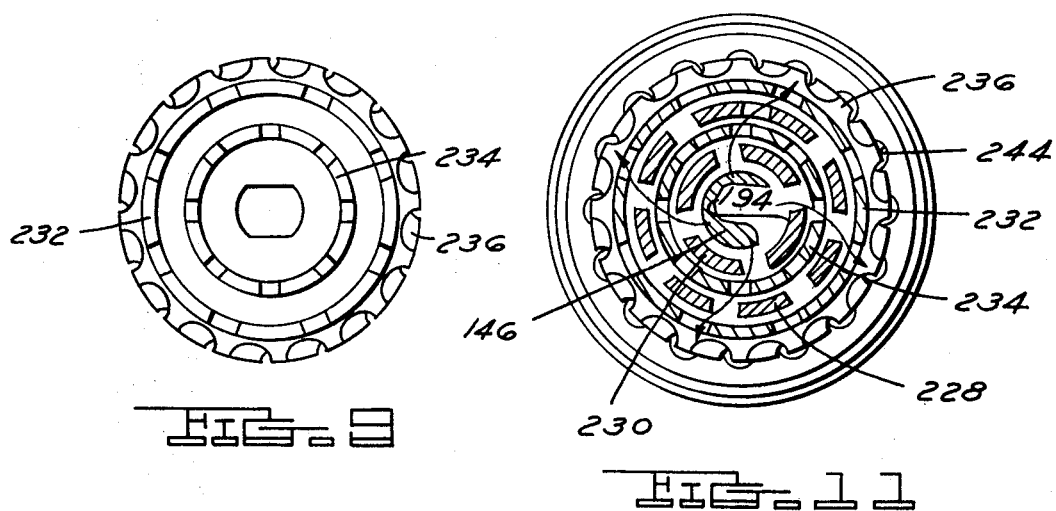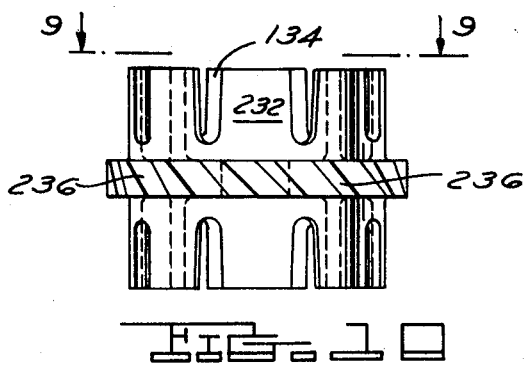

United States Patent Office 3,606,269
Patented Sept. 20, 1971

3,606,269
MIXING DEVICE
Donald E. Trumbull, Sunnyvale, Calif., assignor to
Pyles Industries, Inc., Wixom, Mich.
Filed Feb. 10, 1970, Ser. No. 10,142
Int. Cl. B01f 7/16
U.S. Cl. 259—8                         1 Claim

ABSTRACT OF THE DISCLOSURE

Shown herein a mixing device for receiving plural component flowable materials and mixing them together and dispensing them. A mixer, whose design provides for large face-to-face area of closely spaced relatively moving interrupted surfaces, offsets the otherwise high pressure drop across it by providing a pumping action within the mixer assisting the passage of the components being mixed therethrough. The mixing device further provides for a quick disconnect of the mixer and its associated motor and monitor as an assembly from the remainder of the device to allow flushing of the mixer. Rack and pinion operation of the plural component delivery valves assures simultaneous start and stop of the components' flow.

BACKGROUND OF THE INVENTION

This invention relates to a device for mixing together the components of self-curing resins such as the various polymer resins which involve the intimate mixing of a resin or base material and a catalyst. Once the components are mixed a curing action commences necessitating removal of the mixture from the mixer during the pot life of the mixture to avoid a freeze up of the mixer. While mixers have been developed allowing purging thereof without disassembly of the mixer, such designs require a rather sophosticated system of piping, valves and controls which add to the cost and complexity of the equipment. Therefore there has been a need for a mixer that can be purged more simply than by either its complete disassembly or the complicated integral purge system heretofore in use.

In addition, thorough mixing of the components to provide a homogeneous mixture is essential for a satisfactory end product. Efforts to provide good mixing have largely ignored the efficiency aspect of the mixer design, with the result that efficiency of the mixing action, i.e., horsepower input to volume of mixed material output, has been relatively low.

In the handling of highly viscous component materials, restriction to flow thereof through the passageways leading to the mixer is to be avoided and as the prior art control valves in the inlet passageways have generally tended to restrict the flow even when wide open, a different valve design eliminating or minimizing such restriction when wide open is desirable. Also, such valves should be so designed and actuated that they open and close simultaneously thereby avoiding the introduction of errors in accurate metering of the components occurring upstream of the valves.

SUMMARY OF THE INVENTION

In this disclosure each of the above drawbacks of the prior art has been overcome. the first instance, the mixer, its motor and the mixer monitor are connected together in what I term a mixer assembly which is operably connected by a quick disconnect coupling arrangement to the material delivery and valving assembly such that the entire mixer assembly may be quickly disconnected from the material delivery and valving assembly and reconnected to a mixer flushing system so that the mixer can be purged of mixed material whenever such material is to remain in the mixer beyond the material pot life. In the second instance, I have provided an improved mixer which while providing closely spaced, large, relatively moving surfaces in the mixer to effect high efficiency mixing, includes a pumping feature which assists the flow of the material through the mixer thereby offsetting high back pressure which would otherwise be developed in the mixer. Finally, I have provided improved component control valves comprising ported rotatable ball valves in the material inlet passages which valves are so connected that positive simultaneous operation is assured.

Other objects, advantages, and meritorious features will more fully appear from the following specification, claims, and accompanying drawings wherein:

FIG. 1 is a front view of the mixing device embodying the invention;

FIG. 2 is a fragmentary cross sectional view through the mixer assembly looking in the same direction as FIG. 1;

FIG. 3 is a cross sectional view through the mixer assembly and showing the material delivery and valving assembly connected thereto taken along the line 3—3 of FIGS. 2 and 4;

FIG. 4 is a cross sectional view through the material delivery and valving assembly and showing the mixing assembly in phantom outline taken along the line 4—4 of FIG. 3;

FIG. 5 is a cross sectional view taken on the line 5—5 of FIG. 4 showing the arrangement for simultaneous operation of the component material control valves;

FIG. 6 is a cross sectional view through the mixer monitor drive taken on the line 6—6 of FIG. 2;

FIG. 7 is a view looking toward the open end of the inlet half of the mixing chamber with the rotor and shaft removed for clarity;

FIG. 8 is a view of the open end of the other half of the mixing chamber with the rotor and shaft removed for clarity;

FIG. 9 is an end view of the rotor shown in FIG. 10;

FIG. 10 is a side view of the rotor; and

FIG. 11 is a cross sectional view through the rotor and mixing chamber taken substantially on the line 11—11 of FIG. 2, or in the direction of the Arrow A with portions sectioned for clarity.

The mixing device disclosed herein is shown as assembled in FIG. 1 and includes a suspending strap 20 by which the device may be carried for movement adjacent the work area. It will be understood that the mixing device may be stationarily supported in any other suitable fashion. The device includes a pair of structurally independent assemblies, namely a mixing assembly 22 and a material delivery and valving assembly 24. The two assemblies are juxtaposed as shown in FIGS. 3 and 4 so that component materials to be mixed together are received by the material delivery and valving assembly and conducted thereby to the mixing and dispensing assembly. The two assemblies are connected together by a quick disconnect coupling arrangement which includes an elongated thumb screw 26 threadedly engaged at 28 in the mixing assembly with a split ring 30 received in a suitably provided groove in the thumb screw bearing against a surface of the delivery and valving assembly such that tightening the thumb screw will draw the mixing assembly firmly against the delivery and valving assembly. The thumb screw 26 is provided with a finger engaging portion 32.

Material delivery and valving assembly

The quick disconnect coupling thumb screw 26 is carried by the manifold block 34 which is provided at opposite sides, as shown in FIGS. 2 and 3, with a pair of bifurcated extensions 36 and 38 within which the lower ends of the hanger 20 are received and secured by fasteners 40. The manifold block 34 is also provided with a pair of laterally spaced component material passages, one of which is shown at 42 in FIG. 4, and each of which is provided with a taper threaded mouth within which a correspondingly threaded component material discharge nipple is received; the nipples for each such passage being indicated at 44 and 46 in FIGS. 2, 3 and 4. A sealing ring 48 serves to seal each nipple in the tapered port of the manifold block 34. Each nipple includes a spring loaded cone valve 50 which closes the passageway extension (42a) defined by the interior of the nipple. The stem of the cone valve is threadedly engaged in a ported nut 52 bearing against a coil spring which urges the valve against the outer end of the nipple to prevent reverse flow of components back into the passageway 42a. Upon application of component pressure to the inside of the nipple, the tension in the coil spring is overcome and the cone valve opens to allow component to flow from the nipple to the mixing assembly 22.

It will be noted that the nipples 44 and 46 are arranged to project forwardly from the face 54 of the manifold block and are disposed in parallelism such that the mixing assembly may be telescoped over the nipples by simply moving it perpendicular to the face 54 in the direction of Arrow B in FIG. 4. A pair of parallel nipple receiving bores 56 and 58 are provided in the mixing assembly as more particularly described hereinafter with suitable sealing rings 60 sealing the nipples in such bores. With the mixing assembly telescoped over the nipples and locked in place by the thumb screw 26 relative rotation or separation between the mixing assembly and the material receiving and dispensing assembly is prevented.

As shown in FIGS. 1, 3 and 4 the component materials are delivered to the device through hose lines or the like 62 and 64. Each line brings in one of the component materials, for example the base material may be delivered through line 62 and the catalyst through line 64. The remote ends of such lines are connected to means for metering and pumping the components through the respective lines in predetermined ratio, one such type of metering and pumping arrangement is disclosed in U.S. Pat. 3,207,378. At the mixing device disclosed herein the hose lines are connected to a pair of rotatable ball valves by suitable fittings 66 and 68. The ball valves are shown in FIGS. 3 and 4 at 70 and 72. Each is connected as by screws 74 to the face 76 of the manifold block 34 in alignment with the passages heretofore described and one of which is shown at 42 in FIG. 4. Each ball valve includes a housing having a passageway therethrough which is spherically shaped to receive the ball valve element, such as the element 78 shown in FIG. 4. Each of the ball elements is provided with a through passage, such as the passage 80 in the element 78 such that when the ball is rotated to the position shown in FIG. 4 component material can flow from the hose line 64 through the ball valve and passage 42 and out through the cone valve in the nipple 44, while rotation of the ball 90-degrees will serve to block the flow of component material from the hose line 64 to the passage 42. Such ball valve is a commercially available item and need not be further described except that each is provided with a ball element rotating shaft 82 which extends out of the valve housing coaxially with axis of rotation of the ball 78 and is suitably sealed in the housing wall to prevent the escape of component material around the shaft.

The upper end of the ball rotating shaft of each ball valve is square or of other suitable polygonal shape to be drivingly engaged within a correspondingly shaped recess 84 in the lower end of a gear shaft 86. There are of course two such shafts and they are both shown in FIG. 5 at 86 and 88. The shafts are rotatably supported in a housing 90 which is secured to the manifold block 34 as by screws 92. The housing 90 is provided with a slot 94 as shown in FIG. 5 within which reciprocates a rack 96 connected at one end to a piston 98 operating within the cylinder 100 of a fluid pressure actuator 102. The rack meshes with a pair of pinion gears 104 and 106 which are pinned to the gear shafts 86 and 88 as at 108 and 110. The meshing of the pinion gears with the rack is such that both ball valves open and close simultaneously upon reciprocation of the rack under the influence of the fluid pressure actuator 102. The bottom of slot 94 between the gear shafts 86 and 88 and the actuator 102 may be closed as by a plate 112 held against the housing 90 by screws 114. Screws 116 serve to secure the actuator to the housing 90. Fluid pressure is admitted and exhausted to the cylinder 100 of the actuator by pressure lines 118 and 120 which serve respectively to shift the piston 98 in first one direction and then the other depending upon the pressurization or exhaust condition of the lines. A suitable seal 122 prevents escape of fluid pressure along the rack.

Mixing assembly

The mixing assembly 22 includes a fluid pressure or other suitable motor 124, a mixer monitor 126 which will indicate the speed of rotation of the mixer rotor, a mixing chamber sub-assembly including a mixing rotor 128, a mixing chamber 130 and a water jacket 132. The motor 124 may be of the conventional air operated variety and includes a valve 134 to which fluid pressure to drive the motor is delivered by any suitable hose, not shown, with the valve adapted to control motor speed. The valve connects to the upper end of the motor as at 136. The lower end of the motor may be threadedly received as at 138 in the upper end of a support or block 140 internally bored to receive bearings 142 and 144 for carrying the mixing rotor drive shaft 146 which is secured to the output shaft 148 of the motor as by a pin 150 received in a slot 152 in the output shaft 148.

The monitor 126 comprises a tachometer of any suitable design whose base is threadedly received at 154 in a bushing 156, being locked therein by a set screw 158. The bushing is threadedly connected at 160 in the block 140. The block supports a gear 162, having a connection 164 with the tachometer drive, for meshing engagement with a driving gear 170 on the mixer shaft 146.

The block 140 is secured to the upper side of the mixer manifold 172. A bushing 174 is sealed as at 176 to the manifold 172 and is interiorly provided with a pair of shaft seals 178 and 180 between which a lubricating line 182 discharges to fill the space between the seals with a lubricating grease or the like. An inspection drain 184 is also provided which opens into the space between the shaft seals to indicate seal failure by the leakage of component material through the drain.

As heretofore mentioned component materials are delivered to the mixer by the nipples 44 and 46 which are received in the respective bores 58 and 56 in the mixer manifold 172. The bores 56 and 58 are provided with laterally extending passages 190 and 192 which communicate with a mixer inlet passage 194 coaxial with the shaft 146. It will be noted that the passages 190 and 192 are spaced apart axially along the passageway 194, and that the passage 190 is disposed closer to the seal 180 than is the passage 192. As a consequence component material flowing into passage 194 through passageway 190 will tend to keep any component material from the passage 192 from mixing with component materials adjacent the shaft seal 180.

The mixing chamber 130 comprises a pair of opposed cup-shaped members or halves 196 and 198 which have their rims juxtaposed and sealed as at 200. The chamber halves 196 and 198 are held in the position shown in FIG. 2 by the water jacket housing, itself a cup-shaped member provided with an opening 202 telescoped over the discharge end 204 of the chamber half 198. A pair of thumbscrews 206 and 208, received through a pair of L-shaped retainers 210 and 212, are threaded into the bottom of the mixer manifold block 172. Each thumb screw is provided with a shoulder 214 which bears against the L-shaped retainer when the screw is tightened into the block. Each retainer is received in a notch, such as the notch 216 for the retainer 210, formed in the outer surface of the water jacket housing 132. A seal 218 prevents leakage of coolant fluid from the interior of the water jacket. Hoses 220 and 222 communicate with the interior of the jacket within the space between the inner surface of the jacket and the exterior of the mixing chamber so that coolant fluid delivered and exhausted by the hoses will serve to cool the mixer.

The mixing chamber is provided at axially opposite ends with axially extending concentric interrupted shearing blades 224, 226, 228 and 230 which are shown in greater detail in FIGS. 7 and 8. Such concentric walls or blade elements extend axially from opposite ends of the mixing chamber and are integrally formed with the respective halves 196 and 198 of the mixing chamber. Such concentric walls or blade elements define annular raceways within which the rotor 128 is received. The rotor is itself provided with axially oppositely extending concentric interrupter walls or blade elements which are received between the aforementioned concentric walls or blade elements of the mixing chamber. In FIG. 9 the concentric wall elements are indicated at 232 and 234 and in side elevation they are shown in FIG. 10.

The mixer disclosed herein is particularly well suited for handling highly viscous component materials and because of the close spacing of the rotor and mixing chamber concentric walls or blade elements substantial back pressures would be developed in forcing the material through the mixer. The periphery of the rotor is provided with angularly disposed tooth-like projections or teeth 236 which sweep closely adjacent the inner peripheral surface of the mixing chamber midway of its axial dimension and the angle of such teeth 236 provides a pumping action during rotor rotation serving to reduce the overall back pressure of material flow through the mixer. The blades or teeth 236 at the periphery of the rotor cooperate with axially opposed surfaces 238 and 240 of the respective housing halves 196 and 198, which surfaces are interrupted by axially extending notches 242 and 244 respectively, formed in the encircling inner wall surface of the housing halves.

The rotor 128 is secured on the lower end of its drive shaft 146 by a nut arrangement 246 extending into the discharge passageway 250 of the mixing chamber. Material flow through the mixer is in the direction of Arrow A in FIG. 2 and laterally radially from the passageway 194 to the periphery of the rotor where it is pumped as aforesaid axially across the blades 236 from the grooves 242 to the grooves 244 and thence it passes radially inwardly to the discharge passage 250. During the radial movement of the material components across oppositely facing sides of the rotor it is subjected to a highly efficient mixing action occasioned by the close spacing of the large area confronting surfaces of the concentric walls or blades of the rotor and mixing chamber.

In FIG. 11 the pumping teeth or blades 236 are shown in their juxtaposed relation with the grooves 244 in the lower half of the mixing chamber, and the close spacing between the interrupted concentric walls or blade segments of the rotor and the upper half of the mixing chamber is also depicted. The Arrows indicate direction of material flow.

A set screw 260 suitably sealed as at 262 in the water jacket housing is received in a notch 264 in the exterior of the lower chamber half 198 to prevent rotation of such chamber half.

It will be observed from a consideration of FIG. 4 that the entire mixing assembly 22 may be readily disconnected from the material receiving and delivery assembly 24 by unscrewing the thumb screw 26 and simply pulling the mixing assembly off of the nipples 44 and 46. Upon removal of the mixing assembly as aforesaid it can be quickly connected to a flushing system provided with a pair of nipples corresponding to those shown in the drawings and through which a purging fluid is delivered to the mixing chamber. Desirably the mixing motor 124 is operated during the flushing or purging to insure adequate cleanout.

What is claimed is:

1. In a mixing device for plural component materials: a support, a motor on the support, a mixing chamber on the support containing a mixing rotor connected to the motor to be driven thereby, said chamber comprising a pair of cup members arranged in confronting rim juxtaposition, a sealing element at the juxtaposed rims for sealing the chamber, one cup member having its bottom portion abutting said support and provided with a material inlet coaxial with the cup and the bottom portion of the other cup member provided with a mixed material outlet, the axis of rotation of the rotor being coaxial with the axes of the cups, each cup interiorly provided with a plurality of axially extending component material shearing blade elements, said rotor provided with oppositely axially extending component material shearing blade elements arranged to sweep circumaxially between the first mentioned blade elements, the periphery of said rotor provided with radially extending axially inclined teeth cooperable with the internal periphery of the chamber to provide a pumping action on material in the chamber to urge material on the inlet side of the rotor toward the outlet side of the rotor, and another cup member received coaxially over the first mentioned cups and abutting at least one of them and connected to the support to hold the first mentioned cups in juxtaposed rim sealed engagement, and such last mentioned cup interiorly spaced from the exterior of the first mentioned cups to define a coolant fluid passageway therebetween.

References Cited

UNITED STATES PATENTS

| | | | |
|---|---|---|---|
| 2,738,931 | 3/1956 | Schneider | 259—8 |
| 2,995,346 | 8/1961 | Samples | 259—8 |
| 3,081,069 | 3/1963 | Oakes | 259—8 |
| 3,353,797 | 11/1967 | Simonetti | 259—8 |

WILLIAM I. PRICE, Primary Examiner

P. R. COE, Assistant Examiner

U.S. Cl. X.R.

259—DIG. 30